United States Patent [19]

Getz et al.

[11] Patent Number: 4,623,964

[45] Date of Patent: Nov. 18, 1986

[54] HOMOGENEOUS HIERARCHIAL COMPUTER BUSINESS SYSTEM

[75] Inventors: Marion E. Getz, Raleigh, N.C.; Christopher J. Harris, Hitchin, England; Philip J. McConnell, Barnet, England; Mark L. Norton, London, England; John P. Garrett, Cheshunt, England; Angela I. Harding, Broxbourne, England

[73] Assignee: International Business Machines Corporation, Armonk, N.Y.

[21] Appl. No.: 452,364

[22] Filed: Dec. 22, 1982

[30] Foreign Application Priority Data

Dec. 23, 1981 [EP] European Pat. Off. ........ 81306072.0

[51] Int. Cl.[4] ........................ G06F 15/24; G06F 15/00

[52] U.S. Cl. ...................................... 364/401; 364/200

[58] Field of Search ........................ 364/200, 900, 401

[56] References Cited

U.S. PATENT DOCUMENTS

| | | | |
|---|---|---|---|
| 3,596,256 | 7/1971 | Albert et al. | 364/200 |
| 4,075,691 | 2/1978 | Davis et al. | 364/200 |
| 4,200,930 | 4/1980 | Rawlings et al. | 364/200 |
| 4,246,637 | 1/1981 | Brown et al. | 364/200 |
| 4,400,778 | 8/1983 | Vivian et al. | 364/200 |
| 4,430,710 | 2/1984 | Cartiller et al. | 364/200 |

FOREIGN PATENT DOCUMENTS

| | | | |
|---|---|---|---|
| 0014313 | 8/1980 | European Pat. Off. | 364/401 |
| 1504112 | 3/1978 | United Kingdom | 364/407 |

OTHER PUBLICATIONS

*Data Comm. Nework for Air-Indian & Indian Airline* Dubey et al., IGTE Mid-Term Symposium 1977.

*Primary Examiner*—Jerry Smith
*Assistant Examiner*—Charles B. Meyer
*Attorney, Agent, or Firm*—Karl O. Hesse

[57] ABSTRACT

A modified hierarchical homogeneous real time transaction, consolidated auditing and side processing business system, operating under a system wide parameter control, processes and encapsulates each transaction as a plurality of parameter dominated records in an input terminal, transmitting the records to an attached controller at the end of the transaction. Parameters, required but not stored in the terminal, are requested from the attached controller and stored for the duration of the transaction. First level processors are provided with a tandem pair of facilities to trap, process and re-route system messages, all system interfaces being individually addressable. Additional force to interface paths are provided. Unit inputs incorporate parallel high speed buffers and a terminal record flushing mechanism is incorporated in each transaction terminal. The buffers, mechanisms, and critical registers have their own standby power supplies. Terminals have switches to couple them to one of two alternate bus structures ideally to two different controllers, and the controllers maintain files dedicated to each potentially attached terminal as well as undedicated files. The arrangement permits transactions to be suspended and resumed without disruption, eliminates the first level processor message bottle neck and supports described features of advantage in various combinations.

14 Claims, 4 Drawing Figures

HOMOGENEOUS HIERARCHIAL COMPUTER BUSINESS SYSTEM

DESCRIPTION

1. Field of the Invention

This invention relates in general to hierarchical computer systems and, more particularly, to the real time functions and associated auditing capabilities of such systems.

2. Background of the Invention

A hierarchical homogeneous real time transaction, consolidated auditing and side processing business system is typically a data processing tool used by any large trading business having multiple, geographically spread outlets which interface with the public or otherwise with the outside world in so called "real time" mode, performing limited functions under the control of a system-wide set of parameters (e.g., availability, cost, specification, etc.)

The consolidated auditing, quite apart from legal and business requirements, is needed to maintain currency of the operating parameter set.

The side processing normally bears no relationship to the real time structure and is used, for whatever purposes, of spare computing power at a locality.

When considering such a hierarchical system, the real time function dominates the system design criteria even though, in use, it may not occupy the major part of the processing time. In the following discussion, only the real time function and essential associated auditing will be considered.

A system, such as will be considered hereinbelow, is hierarchical because it comprises a host computer, which may be itself a multiprocessor, located at some central location and supporting a first level of plural processors, each of the latter being located at some convenient geographically-distributed centres, each first level processor in turn, supporting plural processors controllers), which together comprise a second level. Each second level processor in turn supports plural terminals which constitute the real time interfaces.

The relative locations of the various associated controller and terminal groupings are local and are determined by the number of terminals required and the number of terminals that can be supported by each controller. Thus a major location bank, booking office, or store, would house a first level processor, plural controllers and multiple terminals while a minor outlet might only house a controller and a pair of terminals.

Considering only the real time function of existing systems, processing is performed at the host, the first level processors and the controllers, but not at the terminals.

For most uses, this processing is a two way function as will be appreciated in the context of, for example, a ticketing and reservation system. Assume a terminal request for a seat from A to B on day C. The parameter set at the controller will be inspected at least as to times, seat availability and price. Assuming one or more seat sales are effected, this information has to be transmitted to the host and the parameter set updated to reflect the transaction at least as to seat availability in sufficient time for the updated parameter set to be used for the next transaction. The consolidated parameter set is required periodically by the actual transport sections and as well as for accounting, tax and like purposes. Thus traffic is between host as the coordinating point and terminal as the transaction point and back again. Cost changes are inserted at the host in normal circumstances.

In a banking context, a main bank would house a first level processor, one or more associated controllers with the terminals they support, and support a local branch bank housing a controller and terminals only.

In a retail context, a large store would house a first level processor supporting controllers located in major sales areas with terminals at the sales points so that, for example, where the store is of the kind having multiple bunched check out counters, more than one controller will be required at that location to support the necessary plethora of terminals.

The IBM* (*Registered Trade Mark of International Business Machines Corporation) 8100 retail system is typical of such systems, but arising from requirements in the field for the provision of extra functions, it became necessary to restructure the system, not so much that any one system will incorporate all the extra functions, but that the single system structure will support any combination of such features.

Some required functions are specific to types of application, while others are more general in nature and relate to such things as quicker response, greater flexibility, greater resistance to failure, greater capability for safeguarding data, etc., should failures occur, and, faster recovery from any failure to minimize business problems.

While the significance of the various basic modifications made by the present invention, when considered individually and independently, may not necessarily be immediately apparent in combination, the subject modifications nevertheless provide the required system matrix that will support the various, new combinations of requirements that have arisen. These modifications, save in one potential aspect, make no impact on any side processing.

SUMMARY OF THE INVENTION

In general fashion, the present invention effects the following modifications:

(a) to transfer all the front line real time function from the controllers to the terminals so that we have a functionless level separating two function levels;

(b) to arrange for partial copies of the parameter set to be accumulated individually at the terminals; the host, first level processor and controllers maintaining full or effectively full parameter sets; and (c) to arrange for the first level processors to inspect user interfacing requests (as opposed to customer interfacing matters) and to reroute the same according to a preset protocol to what is deemed an appropriate interfacing level (host, first level or controller) at an appropriate priority.

These broadly defined modifications produce the following significant aspects:

(i) the controllers no longer provide a processing bottleneck;

(ii) the first level processors are relieved of user interfacing operations inappropriate to that location;

(iii) each transaction can be encapsulated, essentially in a terminal, so that (a) a transaction can be copied onto another terminal and processed without noticing the transfer;

(b) a terminal can be switched from controller to controller without disrupting the current transaction;

(c) a transaction can be copied back as many levels as desired and subsequently restored enabling that transaction to be interrupted but not disrupted;

(d) a transaction can be displayed at any interface level, including on any connected side processing interface, as it is transacted at a terminal for monitoring;

(e) a transaction is not interrupted by parameter set updates and can be retrogressed using the parameters under which it was built up; and (f) terminal transaction data (aggregate local transaction statistics, for example) are directly available at the terminal and can be protected by the terminal independently of controller failure.

More particularly, each terminal of the new system according to the present invention:

(a) is arranged to process the real time aspects, under normal circumstances, of a complete individual transaction, element by element, within its working storage;

(b) is arranged to request, from its supporting controller, the parameters particularly appropriate to the current transaction element, when such are not resident in its working storage, and to retain such parameters in its working storage for the duration of the transaction;

(c) is arranged to maintain, for the duration of the transaction, an account of the transaction in the form of a plurality of records dominated by parameter and not by transaction element; while each first legel processor incorporates an additional tandem pair of facilities wherein the first facility interfaces with the processor and its storage to trap system user interfacing messages, and constructs and enqueues tasks comprised of individual such messages together with processing programs appropriate thereto. Each first facility is also arranged to dequeue, route and despatch processed messages; the second facility is arranged for dequeuing, processing and re-enqueuing the tasks established by the first facility, the first facility being able both to route processed messages to any user interface of the system, inter alia, into the side processes of the associated first level processor and to force certain such processed messages into the side processing user interface of that first level processor.

Other facilities become practical or have been constructed to complement those specifically listed and reference to such facilities will be made hereinafter in connection with one specific embodiment of a system according to the present invention.

BRIEF DESCRIPTION OF THE DRAWINGS

To assist in the description of the preferred embodiment of the present invention, the following drawings are appended.

DESCRIPTION OF THE PREFERRED EMBODIMENT

Figure 1:
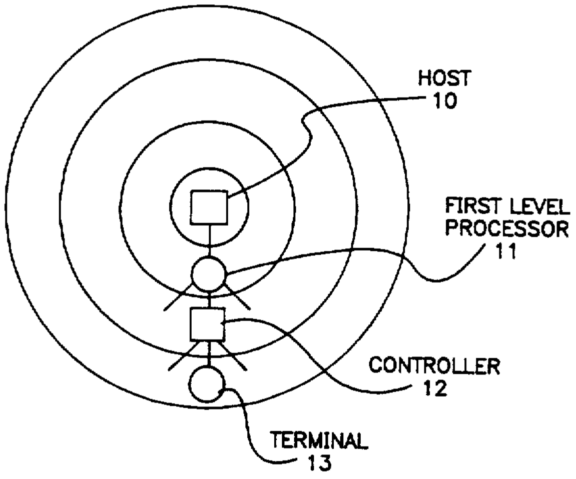
FIG. 1 is an overall system block diagram.

In order to describe one system of the invention by way of example, the specific environment of a country-wide store chain has been selected since this will make it possible not only to bring out the power of the basic system matrix but also to disclose the full combination of features that the matrix can support. However, it will be understood that not all the features will be necessarily required by all users.

All offered or available features must be supportable, but no single feature is, per se, essential to the operation of the overall system other than for its own specialized function.

The basic hierarchical structure, according to the invention, and as adapted for use in a country-wide store chain, comprises a host computing complex 10 located at the head office and supporting data storage, head office data processing, head office user interfaces and providing the focal point of the real time functions of the total system, performing the system-wide consolidated auditing and providing homogeneous real time control throughout the system via a real time parameter set which, in the case of a store chain, may be a price list but which, for a reservation system, would include availability and status and might also include credit controls, exchange rates and so on. It will be noted that the parameter set is not a program but is a tool maintained and used by programs throughout the system. The parameter set is maintained (constructed and updated) in storage in response to user interfacing communication and, certainly in cases in which it includes availability, in response to consolidated auditing functions.

As units peripheral to the host and providing a first level of the total system, processors (11) with associated storage and their own peripherals are located in the stores of the chain, providing a user interface at the store, store data processing and local auditing, system message processing and routing centres and local parameter set storage and maintenance facilities.

As units peripheral to the processors (11), controllers (12) are located conveniently in each store and collectively provide the second level of the system. Each controller includes its own storage and is arranged to maintain its own copy of the parameter set.

As units peripheral to the controllers 12, terminals 13 each with storage and processing capabilities are located at transaction points throughout each store providing the real time interface between the system and the customer. It must be noted that the system has two distinct logical interfaces, one with user (the store chain) and the other with the customer and the requirements of the two interfaces are separate and quite distinct. The customer interface has to operate in real time in units dominated by each individual customer, if only because no customer is going to be willing to wait for his transaction to be batch processed nor to settle his account in combinations with one or more other customers. However, the functions associated with the customer interface form a limited set. The user interface has to accommodate a complete mix of function, real time and batch, specific and general, related to one element of an individual transaction or related to the aggregate of all transactions. One distinction between the two interfaces can be expressed as the customer interface being of high rate low function capability and the user interface being of mixed rate mixed function capability.

In the context of a store chain, the customer interface is defined in terms of a single typical, universal terminal which should be capable of carrying out the following functions, even though in any given situation it may not be required to handle one or more of such functions:

(a) accepting or rejecting any particular operator;

(b) accepting or rejecting any particular customer;
(c) accepting or respecting any particular mode of settlement;
(d) accepting human and/or machine input;
(e) pricing and totalling;
(f) reporting;
(g) serving as a system interrogator;
(h) serving as a substitute element of the user interface.

To this end, the typical universal terminal comprises a relatively large working store, a processor, a keyboard, a scanner, a printer, a display, a cash drawer, a card reader and a communications controller. The structure of the elements of the terminal is of little importance. The inter-relationship and function is significant and will be dealt with in detail hereinafter. With the advent of one and two chip processors, it is possible to interchange program modules and processors at will so that it is preferred to refer to "facilities", so that a store search facility can be a search program or a small specialist processor, what matters is that, when certain events occur, the store is searched according to certain criteria.

Each terminal is physically connected to two controllers where circumstances permit though, logically, it is only connected to one of them at a time. The technique, involving either a physical switch or a programming switch, is well known.

The preferred arrangement is for each controller to support two bus loops, the terminals supported thereby being coupled via their communication controllers in roughly equal numbers to each loop, the terminals of one loop being switchable to one of the two loops of an "adjacent" controller. Clearly where demand is insufficient to warrant two adjacent controllers, the preferred arrangement cannot be employed. The communication controllers also form part of the loop to which they are logically connected so that, by switching selected terminals from one loop to another, it is possible, in effect to couple two loops together and to alter the loop controller allegiance.

Each controller has two communication facilities, one to the bus loops and one to the supporting first level processor, a storage maintenance facility, a user interfacing facility and a logging facility.

Each first level processor has two communication facilities, one to the supporting controllers and one to the host, a relatively extensive side processing facility with a complementary user interface, a storage maintenance facility, a system message trap facility, a system message routing facility and a user interface break in facility.

Concentrating on the real time aspects of the system and assuming that a full up to date copy of the system parameter set exists in the host, each first level processor and each controller, and that, apart from control programs, the working storage of a particular terminal is empty, the course of a customer transaction presented to that terminal will now be traced. Remembering that a customer transaction is dominated by a customer, then either that transaction has been started and is to be continued or it has not yet been started. It will be easier to consider the latter condition first.

For reasons that will become apparent, a transaction identifier is entered into the working storage either via the keyboard or automatically by the entry of the first transaction element at either the keyboard or the scanner. Depending on the organization of the particular store, the first transaction element will be signalled by the entering of coded material into the terminal either via the keyboard or via the scanner. For example, if the element corresponds to the purchase of raw vegetables as part of a collective purchase, the code will signify both identity and weight and will be entered via the keyboard by an operator unless the terminal has attached scales, in which case the weight code will be entered automatically. If the element corresponds to the purchase of one packet of some prepacked, prelabelled commodity, coded by means of a bar code, entry of the element will be via the scanner. Both the keyboard and scanner inputs are processed automatically so that, to the rest of the terminal they appear to be one and the same entity. On receipt of the code, the processor activates the search facility to search working storage for the parameters(s) associated with the transaction element, in the cited example, the price/weight factor of the commodity. If such is contained in working storage, it is accessed, else the processor raises a request to the supporting controller for a copy of the necessary and sufficient parameter(s) from the copy of the complete parameter set contained in the controller storage. The controller processes the request, accesses the copy of the complete parameter set in its storage appropriately and transmits the results to the terminal which stores the same in its working storage, whence it is is accessed. Communication between the terminal and the supporting controller is via the communication facilities of each and the connecting bus loop.

Once the parameter(s) for that transaction are available, the actual cost is generated in the processor, printed at the printer and stored in a record in working storage. The transaction proceeds in this manner element by element save that, multiple elements of the same commodity are recorded in the same record. Thus, if, as a result of a parameter search, the parameter(s) are found to be in working storage, not only they but the associated record is accessed. Though not essential, such parameter(s) can form part of the record.

At the end of the transaction, the accumulated records are transmitted one at a time to the controller to clear working storage for the next transaction which can begin as soon as working storage is cleared. Since records are discrete, a count of initiated records can be accumulated, displayed at the terminal at transmission to controller time, and counted down as records are actually transmitted indicating visually both that the transmission is proceeding and to what stage it has proceeded.

In normal operating circumstances, records received by a controller are merely stored and subsequently transferred to the supporting first level process or where they are processed to provide store auditing and again transferred to the host for chain auditing. Clearly the priority of transfers within the system must relate to the transaction protocol. If availability is an essential component of real time transactions, record transfer must have a high priority. If not, record transfer can have a conveniently lower priority. Further, with certain exceptions, the record individuality is of no great importance once the transaction is complete and advantages can be gained by progressively sorting and consolidating transaction data as it is transferred progressively from level to level.

However, there are circumstances in which record individuality matters. The first is within a transaction since, apart from being an essential facility to the manner of terminal processing of transaction elements, it also supports two features which are sometimes advantageous. The first of these is to accommodate changes of mind by the customer. Suppose, as elements of a transaction, n similar items are involved which all use the same parameter(s), and, having been processed at the terminal and before the transaction is complete, the customer needs to eliminate one such element, it is possible to provide a check to impede deliberate or accidental fraud. The processor can support a facility to compare the cancellation message with the record for that class of element and inhibit the cancellation if key factors do not correspond. This means that one cannot cancel using different parameter(s) and one cannot cancel elements not already entered.

The second feature is that it is possible to transfer an incomplete transaction, usually only as far as the attached controller but, potentially, anywhere within the system, and, subsequently, return it to the same or another terminal for completion. This accommodates terminal failure and customer impulses and enables continued processing using established parameters where availability is not an issue, or established parameter validations where availability is an issue since, if the transaction is suspended for any reasonable period of time, the system parameter set is quite likely to have changed. Thus, one can avoid charging different prices to the same customer for the same commodity in the same transaction in a plain sales context or ensure that the already processed elements of a suspended transaction remain valid in contexts in which availability is an essential criterion.

These modes of operation can be extended to adapt the system to accommodate the type of store transaction in which commodities are accumulated, department by department, a final settlement being made in the accounts department. Traditionally, this type of store has used a transaction card carried round the store by the customer. With this system, since the transaction is an encapsulated data record, it can be called to any terminal within the store so that the physical card can be dispensed with.

A further feature made available by the record structure is that of remotely monitoring a transaction, element by element, at a remote interface. Since a transaction element can belong to only one record, that record can be copied, via the attached controller and first level processor onto, say, a side processing screen of that first level processor as an approximately real time function. The same screen, or a juxtaposed screen can display a closed circuit television picture of the physical activity at the associated terminal and, in this way, fraud, for example, can be detected.

The immediately preceding feature illustrates one significance of the automatic system message routing facility at the first level processor already mentioned. In the parent system, all system messages where automatically displayed at the operator console of the receiving first level processor and it will be apparent that, in realistic terms, the monitoring feature was impossible on the parent system. In the modified system, system messages are trapped at the receiving first level processor (all system traffic must pass through one such), processed, and are routed according to a pre-set protocol to an interface location deemed appropriate all system interfaces being individually addressable. In the monitoring context, the interface location is in the side processing interface of the trapping processor. To take another extreme example, say, a bomb or fire threat emergency message, the message is routed to all interfaces at the location. The same facility can be used to route messages in the opposite direction so that, when the terminals include an operator identity check facility (password, code or the like), a system message can assign particular terminals to particular operators simply by message routing for all terminals supported directly or indirectly by that first level processor. A message requesting operating relief can be routed to the supporting controller while a total system enquiry (as to, say, future supplies) can be routed to the host. The exact protocol is a matter for the user, the feature is provided to support the protocol.

Remembering that the system is a modified form of a marketed product, only addition and modification details will be considered. Essentially, the host is unaltered being already designed to receive messages and to process the same so that no more will be said about the host.

Figure 4:
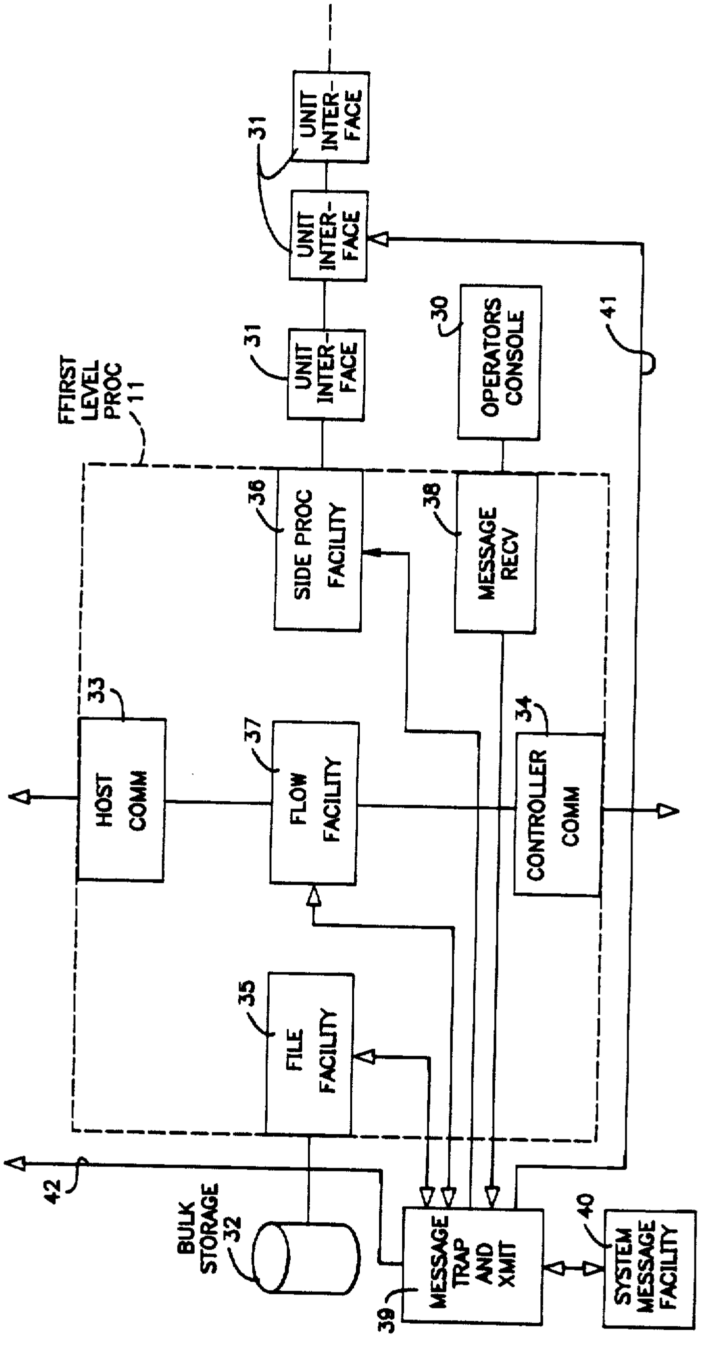
FIG. 4 is a block diagram of a first level processor.

The typical first level processor 11, FIG. 4, already includes an operator console 30, peripheral interface units 31, bulk storage 32, a host directed communications facility 33 and a controller directed communications facility 34.

Further, it already has:

(a) a facility 35 for maintaining files including the parameter set, (b) a facility 36 for side processing, (c) a facility 37 for maintaining flow of transaction data to the host and parameter data to the controllers, and (d) a facility 38 for receiving system messages.

The following tandem facilities have been incorporated:

(e) a facility 39 for trapping and transmitting system messages, and (f) a facility 40 for processing system messages.

As already stated, these two facilities can be independent microprocessors or independent program modules or any mixture of the two. Functionally, they are independent. Facility 39 communicates with existing facilities 35, 36, 37, 38 and has an additional communication path to interface units 31 independently of facility 36. Facility 40 communicates with facility 39 only on a "put and take" basis.

Facility 39 traps system messages received by existing facility 38, identifies the type of message, communicates with existing facility 35, requesting the program suite particular to that type of message (such program suites being stored in bulk storage 32) and, in due time, receiving the same from facility 35 to enqueue both message and program suite to facility 40. Facility 40 extracts, or requests a "next task", in which case facility 39 extracts for it, from the queue in priority order and processes the messages in accordance with the associated program(s), enqueuing the results to facility 39. Facility 39 dequeues and despatches the processed messages in priority order. The precise typing and priority order of messages is user dependent and the trapping enqueuing and dequeuing of messages are standard data processing techniques. The despatching of processed messages is of interest as facility 39 has, in certain cases, two routes by which a processed message can be routed to an interface, via the existing facilities 37 and 38 and by direct communication line, (as shown, line 41 to peripheral units 31 and line 42 to the host), the manner used being instructed by the processing performed by facility 40 and the target destination being similarly instructed.

The significance of the double routing is that direct messages (via 41 and 42 for example) are forced onto the interface generally (as for a fire alarm) or specifically (onto the security interface only for security alert). Messages routed via 36 take their turn. It follows that the message handling program suite(s) must be written specifically for the user so that the targets are properly chosen and the expected message traffic via direct routes is low and that via facilities 37 and 38, high.

The controllers 12 are processors, little changed as to structure but modified as to function. In the context of customer transactions, they normally perform no processing function, though each possess a processing facility 60 communicating with a user interface 61. In the event of failure or disconnection from the "attached" processor 11, they can maintain a reduced customer transaction capability at their attached terminals 13. Their basic capability is one of file maintenance and message exchange. Each supports its own bulk storage 62 via a file maintenance facility 63 and incorporates a processor directed communication facility 64, a terminal directed communication facility 65 and a facility 66 for maintaining data flow between facilities 60, 63, 65, and 66. Since the customer transaction processing is performed in the terminals, the communication facilities 64 and 65 are each protected by a respective parallel buffer 67, 68; each having an independent standby power supply 69, 78 (normally a battery) although their normal operation is powered by the controller power supply. It is pointed out that the controllers 12 of the basic system are arranged to flush their contents to non-volatile storage automatically in the case of a power fault and it is possible to incorporate buffer protection in this existing mechanism as an alternative to the described arrangement. Data traversing the controller or being stored in the controller is retained in the appropriate buffer until acknowledgment of its correct disposal is signalled. Assuming that bulk storage 62 is non-volatile (disk, tape, etc.), a very fast buffer rendered non-volatile (though not necessarily usable) by its standby power supply, securing data transmission against power disturbances and destination failure, permitting subsequent recovery. In addition, it permits data to be received at burst rates greater than the normal data handling facilities 60, 62, 63, 66 can handle. A similar arrangement can be provided at each system receiving connection providing for recovery of transients in the event of total system failure.

As already mentioned, the controller is already organized to maintain and access on demand, for updating from the attached processor 11 and for processing purposes by the attached terminals 13, a complete parameter set. In addition, it is arranged to maintain a dedicated area for each potentially attached terminal ("potentially" will become clearer later) so that the contents of the terminals working storage can be held at known locations as well as to provide storage for controller program suites and working storage for such processing. Such storage is extensive, since, one function of the controller is to stand in lieu of the "attached" processor, when such processor is down. This may be regarded as a side processing function since it involves routing all local system messages to the controllers user interface, filing all transaction data and filing control data such as operator authorizations which can be effected via the controllers user interface 61. Corresponding to this function, the processors 11 are provided with recovery program suites which, assuming restoration after processor failure, access the filed transaction data and control data in all attached controllers, for reconciliation and processing. In this way, the total systems function is degraded but not prohibited. Further, authorization errors, which can easily arise with each controller operating independently, can be detected and eliminated.

Another fail "soft" feature can be accommodated due to the individual customer transactions being processed in the terminals and not in the controllers. As illustrated, the terminals 13 (two only being shown) can be attached by loop bus structures (of themselves well known). Each controller supports two such structures, each supporting, ideally, half the attached terminals. Each terminal is "attached" to two structures, one of the pair of each of two controllers where the storage organization permits. "Attachment" involves a physical aspect and also a logical aspect. Physically, the terminals are attached to two bus structures but logically only to one at a time, a physical or program switch (not shown) being provided to determine the current logical attachment. By this arrangement, it is possible to transfer a terminal to another controller (hence the previous reference to "potentially"), but the processing at that terminal is not interrupted since, for processing purposes, all the terminal requires is parameters, and all controllers maintain complete parameter sets. The preceding processing of the transaction is logged in the terminal and so is not affected and, further, only new parameters are needed so that continuity, if so required, can be preserved. It will be apparent, that where only one controller can be economically justified in a given location to support the local terminals, the double bus structure still has advantages in that the terminal switching is now between the two bus structures which at least can circumvent wiring faults.

Figure 2:
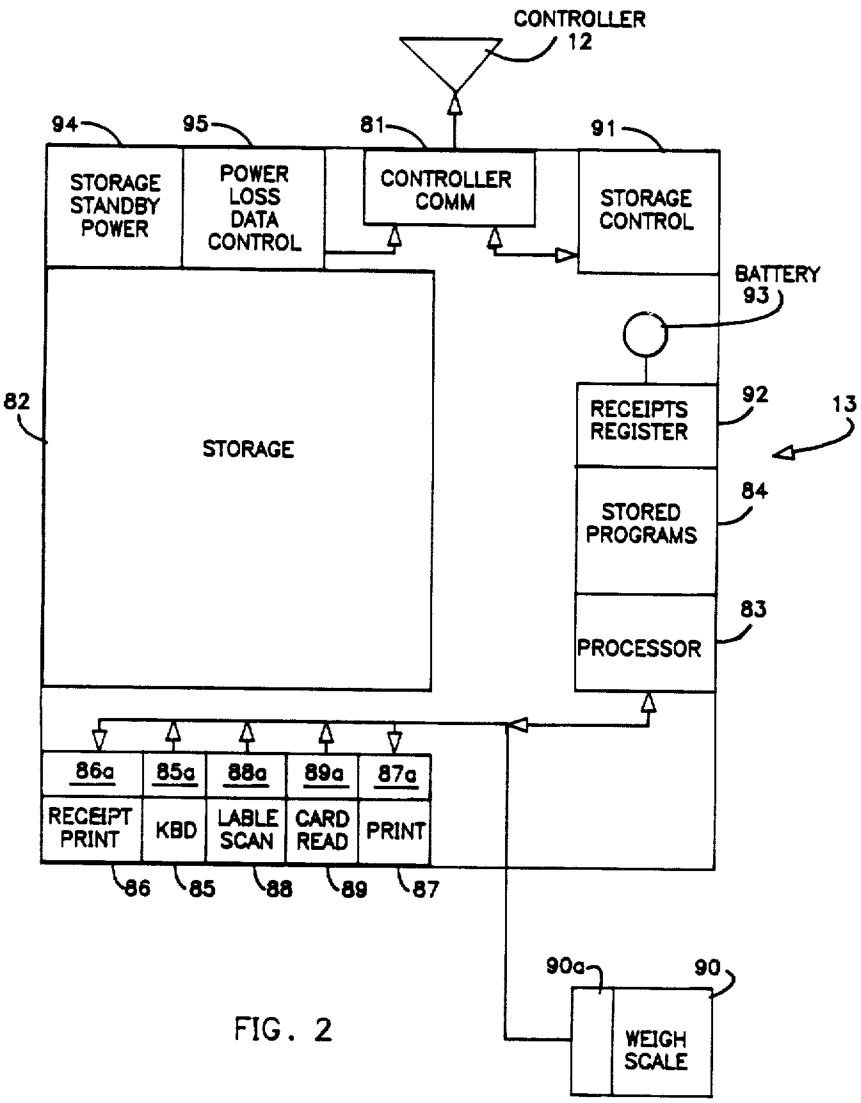
FIG. 2 is a block diagram of a terminal.
Figure 3:
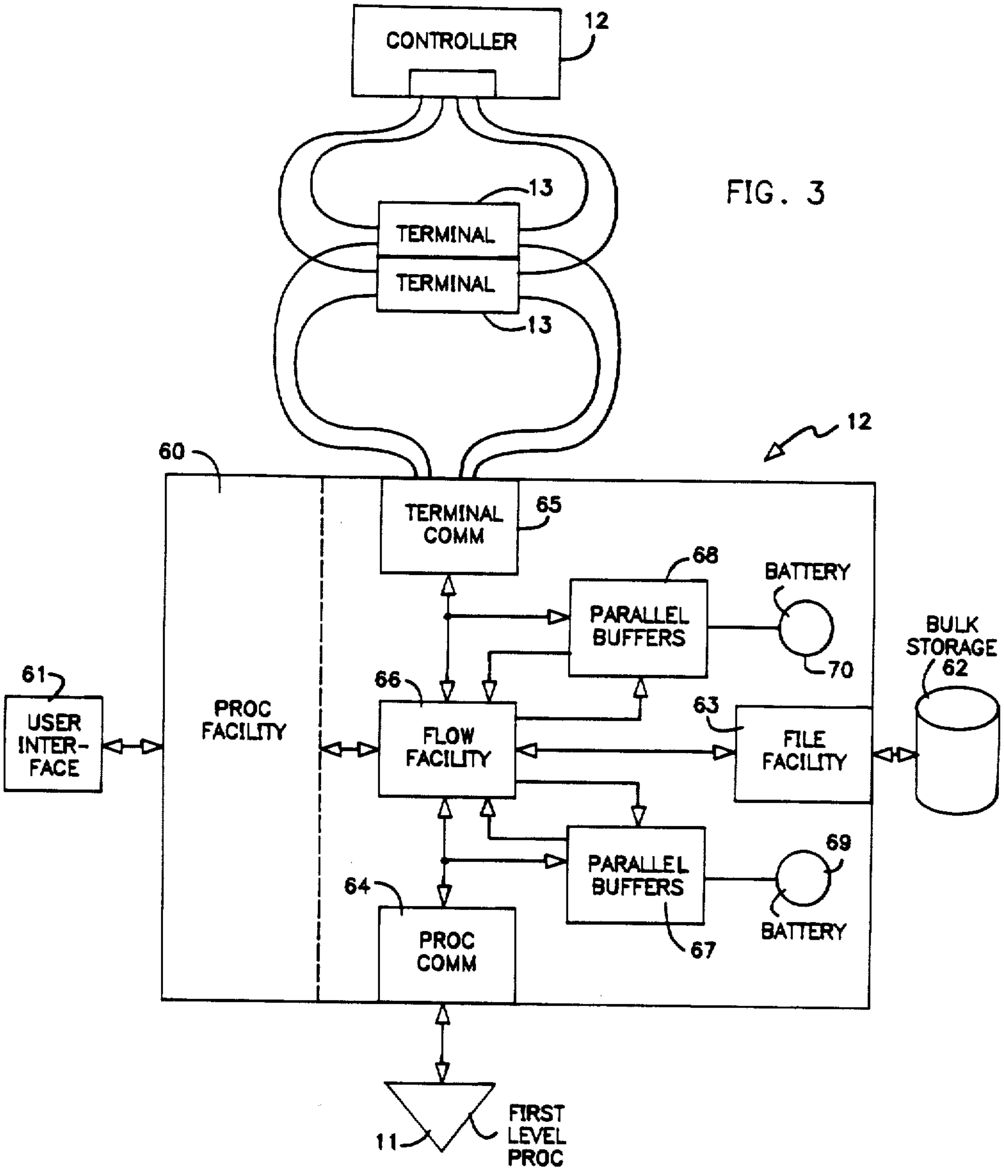
FIG. 3 is a block diagram of a controller.

The terminal 13 detailed in FIG. 2 incorporates elements not necessarily required by all terminals. In the simplest case, it can be expected to incorporate the existing controller directed communication facility 81, storage 82 (though of a much increased capacity), a processing capability 83, 84 (of greater capability since any apparently functionless input output terminal has, of necessity, some processing capability if only to assemble messages and display messages) and a keyboard/printer pair 85, 86. A cash drawer may or may not be provided depending on user requirements. Clearly a keyboard/display pair 85, 87 may replace the keyboard/printer pair 85, 86 and would be sufficient interface for a terminal dedicated to customer enquiry and local system message input only.

The general terminal can be expected to include, in addition, a label scanner 88, a card reader 89, and possibly, a weighing scale 90.

Each interfacing facility 85 to 90 has its own elementary processing facility (85*a* to 90*a*) to specifically control output, in the case of the printer 86 and display 87 and to translate all inputs to the same form so that the true processing facility (83, 84) sees effectively only a single input. The processing facility (processor 83 and stored programs 84), via a storage controller 91, has the capability of processing each element of a transaction and of aggregating that transaction. The precise functions involved depend on the imposed character of the terminal but are, of essence, simple and quickly executed. They may or may not involve a pure enquiry phase (travel transactions would, a checkout cash settlement operation would not), and would normally involve a cash calculation per element and a totalling operation in the main transaction phase. In either phase, there is an input, from one or more of facilities 85, 88, 89, 90; identifying a transaction element, in response to which the storage 82 is searched for the parameter(s) specifically associated with that element. If present, they are displayed, if in enquiry mode, or used to perform a cost or other calculation, with or without being displayed, in transactions mode. If absent, a request to the attached controller is assembled and transmitted via the communications controller 81. On receipt of the requested parameter(s), storage is updated and the calculations performed. In either case, the results of the calculations are stored in a record in storage which is identifiable in terms of the parameter(s) used. The simplest example is that of the simple purchase of an array of commodities. Assuming some commodities carry a bar code label identifying the commodity and some commodities do not, the commodities are presented sequentially either using the scanner as input or the keyboard (with or without the scale) as appropriate. The price per unit is either in storage or is brought to storage and the cost to the customer calculated. Thus a record is accumulated for each commodity type and not for each element of the transaction. The fourth input commodity A, will cause the record for commodity to be updated from "3 A at "PRICE"=COST" to "4A at "PRICE"=NEWCOST". As a record is established a record count is incremented in a working register in the processing facility 83 and a cost total is updated in another working register in the processing facility 83 as each cost increment is established.

However, supposing that the transaction element is to remove one of commodity A from the transaction, the storage is still searched to obtain both parameter and record in to check the record for validity, to check that the commodity, supposed to be deleted, in fact exists in the record and, by displaying the element of the transaction and the record before and after, proving to the customer that the transaction element (deletions) has been effected. The check is both to the user and to the customer.

Assuming the elements of the transaction are exhausted, and represent, in totality, a purchase, the store records are used to calculate a total, to be compared against the accumulated total in the specified working register in the processor 83, such total being stored as a record, and to exercise the printer 86 to print a receipt, change and settlement being calculated and printed in the normal manner in the case of cash settlement. At this point, the customer releases the terminal and the records in storage are transmitted to the attached controller, record by record, the count in the specified working register in the processor being decremented and its contents displayed. This provides an indication that the transfer is progressing, how far it still has to go and, eventually, that it is complete. It is possible to test the specified register for "all zero" and to display some such message as "terminal ready" if it so be desired.

It is normal for multiple forms of settlement to be used (cash, credit card, account and cheque). If a credit card is used, or an account token, the reader 89 is required to input data from the card for validation, this being handled by an appropriately structured system as a transaction element (i.e., parameters are obtained and calculations performed). Equally, it is possible for operators to sign onto a terminal by means of a token presented to the reader with or without a presented memorized check number entered at the keyboard, such operator enabling being by parameter set originated at store level, i.e., at the first level processor or at any user interface supported directly or indirectly thereby and is local to that store but prevents duplicated enabling of an operator at more than one terminal.

With actual payment at the terminal an aggregate receipts register 92 with its own standby power supply 93 can be provided, the register being updated for each cash and cheque settlement but not for credit card or account settlements, for example. Each register is incremented by the terminal automatically but cannot be reset or decremented by normal (non-privileged) operation. The standby power will hold the register contents in the event of power failure though the register is normally powered from the terminal power supply. This prevents corruption of check totals by randomisation of the register in the event of failure of that part of the system.

Further, a separate standby power supply 94 is provided for the storage 82, either to hold storage in the event of failure if the controller finishes, or, as shown, to flush its contents into the bulk storage 62 of an attached controller if the controller holds, it being remembered that storage has a reserved file for such data and a buffer mechanism 68 to accept such data at an otherwise unacceptably high rate. A controller 95 is provided in each terminal, powered by the standby power supply 94 to control the flushing operation.

The reserved files have a secondary use, namely, to accept all that exists of a deliberately suspended transaction, transferred by normal transfer methods, to free the terminal for other transactions. Since the transaction record structure is independent of controller and terminal, a stored suspended transaction can be written back into any attached terminal for resumption as already indicated.

There are various possible protocols for maintaining a parameter subset in each terminal, the simplest is that disclosed, namely, hold for transaction once requested. Another is to transfer and maintain (hold and update) a first subset (those parameters expected to be used most frequently), and to hold for transaction once requested any others. This can be extended to a third subset, like the first, except that they are seldom expected to be used. With this last arrangement, it is thought that the dedicated use of a segment of storage in each terminal is more than offset by reduced parameter traffic at and from attached controllers provided that the store business is suitably organized.

Since each input facility has its own processing facility, it is possible to store test the system by applying data (simulating, for example, keystrokes) directly to the appropriate processing facility at a rate greater than could ever be accomplished naturally. Test data can also be supplied directly to the processors 83 by bypassing the individual input processing facilities. One way of accomplishing either of these, where units are plug interconnected, is to disconnect the appropriate number of system units and plug in, instead, appropriate specialist hardware testers. Further, as all inputs appear as one to the processors 83, and the transactions are controlled internally by the parameters, it does not matter if the operator understands that which is entered. Thus, whether alpha-numeric character codes or machine readable marks or both are impressed on commodities, an operator is only required to enter by scanner or keyboard or both that which is impressed. Thus, randomly, check data can be impressed, unknown to the operator but detectable by the terminal, as an antifraud integer.

It is possible to use the transaction terminals, at night, say when all customers have gone, as extra user system interfaces. For example, by suitably organizing the printer processing facility supporting a matrix printer, it is possible to print bar code labels, by overprinting repeatedly always in the same direction (rather than in both directions as with normal use of such printers). The operation requires the print medium to be changed and is slow, but with no customer transactions to be accommodated, it provides a net gain.

Since the display (if present) has its own processing facility, the data input (from whatever source, since it all looks the same can be displayed as it is entered. Errors can be displayed in plain language text and diagnostic programs particular to the display can be built-in and exercised independently of the rest of the terminal. The printer can be similarly tested.

Finally, commenting on the "parameter set" concept, some users will understand this term to incorporate more than transaction controlling data, such as, for example, and in addition, system configuration data. Clearly, system configuration data can be localized since a controller has no use for all the configuration data required by a first level processor. It follows that, if a wider meaning is attributed to "parameter set", it will no longer be correct to expect a complete set to be maintained in all processors 10, 11 and 12 but the effect is that of completeness as far as transactions are concerned.

Thus, it will be seen that the basic system modifications provide a matrix that will support a great many features in any combinations as demanded by individual users while providing, other things being equal, greater real time processing speed, improved system message response, and greater resistance to system failure (i.e., it fails softer).

We claim:

1. In a homogeneous hierarchial real time transaction, consolidated auditing and side processing business system having a host processor coupled to a first level of plural processors, each first level processor being coupled to plural controllers in a second level, and each of said controllers being coupled to plural terminals in a third or transaction interface level; the processors and controllers maintaining complete copies of a system wide parameter set for the control of transactions interfaced with the system means, the aforesaid structure of interconnected processors being a tree structure for the purposes of communicatng between the host processor, the other processors and their associated storage for updating of the parameter set copies and the concentration of transaction data for consolidating auditing purposes, the terminals each including working storage maintaining input/output control programs and providing temporary storage for transaction data en route from the terminals to the supporting controllers, the improvement comprising:

(a) each of said terminals having means to process a complete individual transacting, element by element, within said terminal's working storage;

(b) each of said terminals being further adapted to request from its supporting controller parameters particularly appropriate to a current transaction element when said parameters are not resident in said working storage and to retain said parameters in said working storage for the duration of a transaction;

(c) each of said terminals also being adapted to maintain, for the duration of a transaction, an account of said transaction in the form of a plurality of records dominated by parameter rather than transaction element;

(d) each first level processor incorporating a tandem pair of means, the first of said pair of means interfacing with its processor and the storage thereof to trap system user interfacing messages, construct and enqueue tasks comprised of individual such messages including processing programs appropriate thereto, and to dequeue, route and dispatch processed messages; the second of said pair of means dequeueing, processing and re-enqueuing the tasks established by the first means, the first means being able both to route processed messages to any user interface of the system, into side processes of an associated first level processor and to force certain such processed messages into a side processing user interface of that first level processor.

2. A business system as claimed in claim 1 wherein each of said terminals have input devices respectively of differing characteristics each supported by its own dedicated processing means adapted to translate any output from a device attached to the terminal into a form that is common to all the devices so that it appears to the terminal that only one device is attached.

3. A business system as claimed in claim 2 wherein the individual processing means have data inputs bypassing the ones of said devices served thereby, whereby test data simulating operations of such devices can be entered at a rate exceeding the inherent data rates of said devices to stress test the system.

4. A business system as claimed in claim 2 wherein each of the said terminals have output devices each supported by its own processing means, said means including diagnostic mechanisms to test the supporting devices.

5. A business system as claimed in claim 4 wherein one of said output devices is a display arranged to display input actual data as supplied to the individual processing means serving said device, and hence to said system as a whole, as well as the processor and system and error messages translated into plain language text.

6. A business system as claimed in claim 4 wherein one of said output devices is a matrix printer, and wherein said business system further comprises: processing means arranged to drive the printer in a bar code printing mode of repeated overprints in the same direction.

7. A business system as claimed in claim 2 wherein each of said terminals is responsive to an input transaction element signifying deletion of another element of the transaction to access the record encompassing the transaction element to be deleted, to compare the element and the record and enable the deletion only if the record incorporates the element to be deleted.

8. A business system as claimed in claim 1 in which each of said terminals is arranged to accumulate a count of the number of said records generated during the processing of each transaction, to transmit such records to an attached controller at the end of each transaction, decrementing and displaying the count appropriately, to transmit such records on demand or to copy such records on demand and transmit such messages on suspension of a transaction, each controller including bulk storage formatted to provide a reserved file dedicated to each potentially attached terminal for receipt of the records of suspended transactions and their subsequent return to the same or another terminal, together with unreserved storage to retain records, for subsequent reconciliation, when operating unattached to an appropriate first level processor.

9. A business system as claimed in claim 8 adapted to accommodate cash transaction and including an aggregate receipts register with its own standby power supply, such register not being resetable by normal terminal processing and being incremented, when appropriate as part of the termination phase of a transaction involving a cash settlement, such register being thus protected against being unintentionally altered, changed to a false value, or totally wiped out due to system failure.

10. A business system as claimed in claim 8 including a standby power supply for working storage and a storage controller also powered thereby arranged to flush the contents of the working storage in burst mode to an attached controller in the event of power failure.

11. A business system: as claimed in claim 10 wherein at least some of said terminals are physically attached to two bus systems, each of said bus systems being associated with a different controller, said terminals each incorporating switch means defining the current logical attachment of that terminal to one of the bus structures only.

12. A business system as claimed in claim 10 wherein at least terminal inputs to the controllers incorporate a parallel fast buffer rendered nonvolatile by its own standby power supply in the event of local failure, enabling system reconciliation on restoration after failure.

13. A business system as claimed in claim 1 wherein each of said terminals is arranged to maintain at least one fixed subset of updatable system parameters in addition to holding for a transaction parameters requested and received from its controller for said transaction.

14. A business system as claimed in claim 1 in which each system interface is addressable at least by said tandem means whereby, human operator enabling criteria can be routed to specific interfaces attached to a first level processor, any record generated in a terminal can be copied onto any other interface and message routing can be interface selective.

* * * * *